(12) United States Patent
Ichise et al.

(10) Patent No.: US 9,109,589 B2
(45) Date of Patent: Aug. 18, 2015

(54) ELECTRIC COMPRESSOR AND ASSEMBLY METHOD THEREOF

(75) Inventors: Yuki Ichise, Tokyo (JP); Takayuki Hagita, Tokyo (JP); Masayuki Ishikawa, Tokyo (JP); Takeshi Hirano, Tokyo (JP); Takayuki Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 412 days.

(21) Appl. No.: 13/519,926

(22) PCT Filed: Aug. 26, 2010

(86) PCT No.: PCT/JP2010/064490
§ 371 (c)(1),
(2), (4) Date: Jun. 29, 2012

(87) PCT Pub. No.: WO2011/104910
PCT Pub. Date: Sep. 1, 2011

(65) Prior Publication Data
US 2012/0282123 A1     Nov. 8, 2012

(30) Foreign Application Priority Data
Feb. 25, 2010 (JP) ................. 2010-041086

(51) Int. Cl.
*F04B 39/00*  (2006.01)
*F04B 39/14*  (2006.01)
(Continued)

(52) U.S. Cl.
CPC ............. *F04B 39/14* (2013.01); *F04C 18/0215* (2013.01); *F04C 29/0078* (2013.01);
(Continued)

(58) Field of Classification Search
CPC ............... Y10T 29/49009; Y10T 29/49245; F04B 39/14; H02K 15/0012; H02K 1/28; F04C 2230/60
USPC ............. 417/423.12, 423.7, 423.14, 410.5; 29/888.022
See application file for complete search history.

(56) References Cited

U.S. PATENT DOCUMENTS 4,340,830 A     7/1982   Hoyer-Ellefsen
5,272,803 A    12/1993   Harrison et al.
(Continued)

FOREIGN PATENT DOCUMENTS

JP     56-129547 A     10/1981
JP     58-192455 A     11/1983
(Continued)

OTHER PUBLICATIONS

International Search Report of PCT/JP2010/064490, mailing date Nov. 22, 2010.
(Continued)

*Primary Examiner* — Bryan Lettman
(74) *Attorney, Agent, or Firm* — Westerman, Hattori, Daniels & Adrian, LLP

(57) ABSTRACT

A main-bearing outer diameter of an electric motor is made smaller than a rotor outer diameter without causing a drop in production efficiency, and the ease of performing a shrink-fitting step is also enhanced by making it possible to mount a rotor to a main shaft in an early stage. A bearing journal portion (14b) of a main shaft (14) of an electric motor is formed in a shape into which an inner race (18b) of a main bearing (18) can be press-fitted from both sides in the axial direction thereof, and, in addition, an outer diameter of the bearing journal portion (14b) is made larger than an outer diameter of a rotor press-fitting portion (14a), whereas a bearing bore portion (5a) of a partition member (5) is formed in a shape into which an outer race (18a) can be press-fitted from both sides in the axial direction thereof. It is preferable that a space (S) into which a press-fitting tool for press-fitting the main bearing (18) can be inserted be provided between the rotor press-fitting portion (14a) of the main shaft (14) and the bearing journal portion (14b) thereof.

2 Claims, 8 Drawing Sheets

(51) Int. Cl.
*F04C 18/02* (2006.01)
*F04C 29/00* (2006.01)
*H02K 5/173* (2006.01)
*H02K 7/08* (2006.01)
*H02K 15/00* (2006.01)
*F04C 23/00* (2006.01)
*H02K 1/28* (2006.01)

(52) U.S. Cl.
CPC .............. *H02K5/1732* (2013.01); *H02K 7/083* (2013.01); *H02K 15/0012* (2013.01); *F04C 23/008* (2013.01); *F04C 2230/60* (2013.01); *H02K 1/28* (2013.01); *Y10T 29/49245* (2015.01)

(56) References Cited

U.S. PATENT DOCUMENTS

| | | | |
|---|---|---|---|
| 6,874,996 B2 * | 4/2005 | Iwanami | 417/374 |
| 2003/0223898 A1 | 12/2003 | Fujioka et al. | |
| 2008/0054747 A1 | 3/2008 | Helmi | |
| 2008/0066292 A1 | 3/2008 | Matsubara | |
| 2009/0246048 A1 * | 10/2009 | Kawasaki et al. | 417/423.4 |

FOREIGN PATENT DOCUMENTS

| | | |
|---|---|---|
| JP | 5-328686 A | 12/1993 |
| JP | 6-284647 A | 10/1994 |
| JP | 2002-339883 A | 11/2002 |
| JP | 2003-201977 A | 7/2003 |
| JP | 2005-168098 A | 6/2005 |
| JP | 2006-506939 A | 2/2006 |
| JP | 2008-099365 A | 4/2008 |

OTHER PUBLICATIONS

Decision to Grant a Patent dated Dec. 10, 2013, issued in Japanese Patent Application No. 2010-041086, (4 pages) Explanation of Relevancy—"The Decision to Grant a Patent has been received".

* cited by examiner

ELECTRIC COMPRESSOR AND ASSEMBLY METHOD THEREOF

TECHNICAL FIELD

The present invention relates to an electric compressor in which an electric motor and a compressor are coaxially integrated in a housing and which is suitable for use in a vehicle air conditioner in particular, and to an assembly method thereof.

BACKGROUND ART

In recent years, there has been a rapid advance in the development and market introduction of vehicles other than automobiles that travel by means of internal combustion engines, such as electric automobiles and hybrid automobiles, or ones that travel by means of motive power from electric motors, like fuel-cell automobiles. In many air conditioners for such automobiles whose motive power is provided by electric motors, with regard to compressors that compress and feed refrigerant, electric compressors whose motive power is derived from the electric motors serving as a driving source are also employed.

In addition, air conditioners for automobiles that travel by means of motive power from internal combustion engines also include those that employ electric compressors instead of compressors driven, via electromagnetic clutches, by the internal combustion engines used for traveling in order to alleviate the deterioration in drivability associated with contact breakages in the electromagnetic clutches.

As such electric compressors, sealed electric compressors in which electric motors and compressors are built into and coaxially integrated in a single housing have been employed, as disclosed in FIG. 1 of Patent Literature 1. As with many other electric compressors, the electric compressor disclosed in Patent Literature 1 is formed by joining a compressor-side housing, which accommodates a compressor, and an electric-motor-side housing, which accommodates an electric motor, and a partition member is disposed therebetween so as to separate them.

Then, a rear end and the vicinity of a front end of a main shaft of the electric motor are supported with a large-diameter main bearing that is press-fitted to the partition member and a small-diameter sub bearing provided at a back portion of the electric-motor-side housing. A rotor that forms the electric motor is provided at an intermediate portion of this main shaft so as to rotate integrally together therewith. The rotor is generally shrink-fitted to the main shaft. In addition, the front end of the main shaft protrudes into the compressor-side housing and is connected thereto to drive a rotational compression member that forms the compressor.

With the electric compressor of Patent Literature 1, the main-bearing outer diameter is made smaller than the rotor outer diameter. By making the main-bearing diameter smaller than that of the rotor in this way, a structure around a connecting portion between the main shaft and the rotational compression member of the compressor can be made more compact, the weight thereof can be reduced, and the assembly thereof can be simplified.

As for the main bearing, an outer race (outer wheel member) thereof is press-fitted to the bearing bore portion formed in the partition member from the electric-motor side, and the outer race is brought into contact with a positioning flange formed at an inner circumference of the bearing bore portion at the end thereof on the compressor side, thus setting the position thereof. In addition, a bearing journal portion formed in the main shaft is press-fitted to an inner race (inner wheel member) of the main bearing from the compressor side, and the inner race is brought into contact with a positioning flange formed at an outer circumference of the bearing journal portion at the end thereof on the compressor side, thus setting the position thereof. Here, expressions "press-fitted from the electric-motor side" and "press-fitted from the compressor side" indicate from which side of the partition member or the main bearing the press-fitting is performed; it does not indicate that the press-fitting is performed inside the housing of the electric compressor, and the individual press-fitting procedures are actually performed in a state in which the partition member, the main bearing, and the main shaft are outside the housing of the electric compressor.

In this electric compressor of Patent Literature 1, the assembly order of the main shaft, the rotor, the main bearing, and the partition member is presumed to be as follows. Specifically, the assembly order is such that, first, the outer race of the main bearing is press-fitted to the bearing bore portion of the partition member from the electric-motor side; next, the bearing journal portion of the main shaft is press-fitted to the inner race of the main bearing from the compressor side; next, the rotor is inserted into a rotor press-fitting portion formed at the intermediate portion of the main shaft from the electric-motor side and is shrink-fitted thereto; and, finally, the rotor is cooled, which establishes the shrink-fitting.

CITATION LIST

Patent Literature

{PTL 1} Japanese Unexamined Patent Application, Publication No. 2008-099365

SUMMARY OF INVENTION

Technical Problem

However, with the assembly order described above, because the main shaft, the main bearing, and the partition member are integrated in stages before the rotor shrink-fitting step, making the workpiece shape to be handled large, during the rotor shrink-fitting step and during transport to the next step, as well as during storage in a state in which the shrink-fitting has been completed, pallets used for transportation and storage must be made large, and a considerable storage space is also necessary.

In addition to the workpiece shape becoming large in the shrink-fitting step in this way, because the partition member freely rotates with respect to the main shaft via the main bearing, it is difficult to hold the workpiece, and it may be dropped, hit, and so forth during handling, causing various parts to be damaged or to form dents in the main bearing, which deteriorates the durability thereof.

In order to enhance the ease of performing the task by reducing the size of the workpiece shape during the rotor shrink-fitting step and after the shrink-fitting step, it is desirable to make the assembly order such that the rotor is shrink-fitted to the main shaft first, and the inner race of the main bearing is subsequently press-fitted to the main shaft. However, if the rotor and the main bearing are mounted to the main shaft first, problems such as the following occur when subsequently press-fitting the outer race of the main bearing to the partition member.

Specifically, because the outer race is press-fitted to the partition member by being pressed from the electric-motor side, the outer race needs to be pressed with a press-fitting tool; however, because the rotor outer diameter is larger than the main-bearing outer diameter, the rotor protrudes so as to overlap with the outer race, and the rotor interferes, making it impossible to insert the press-fitting tool between the outer race and the rotor. However, if the rear end of the main shaft is pressed to press-fit the outer race to the partition member, an axial load (a shearing load in the axial direction) is exerted between the inner race and the outer race of the main bearing, which causes dents, and, moreover, the inner race that has already been press-fitted may be shifted with respect to the main shaft, which is not desirable.

In addition, even if the outer race of the main bearing is press-fitted to the partition member first, and the bearing journal portion of the main shaft is subsequently press-fitted to the inner race from the electric-motor side, because the positioning flange is formed at the outer circumference of the end of the bearing journal portion on the compressor side, as described above, press-fitting thereof is impossible. In this way, with the electric compressor in which the main-bearing outer diameter is smaller than the rotor outer diameter, there are many restrictions in the press-fitting order of the main shaft, the main bearing, the partition member, and the rotor, which makes the production efficiency low.

The present invention has been conceived in light of the above-described circumstances, and an object thereof is to provide an electric compressor in which a main-bearing outer diameter can be made smaller than a rotor outer diameter in an electric motor without causing a drop in the production efficiency thereof and which also makes it possible to mount the rotor to a main shaft in an early stage, thus improving the ease of performing a shrink-fitting step, as well as to provide an assembly method thereof.

Solution to Problem

In order to solve the above-described problems, the present invention employs the following solutions.

Specifically, an electric compressor according to a first aspect of the present invention is an electric compressor in which an electric motor and a compressor are coaxially integrated in a housing; a rotor is shrink-fitted to a rotor press-fitting portion formed at an intermediate portion of a main shaft of the electric motor; an inner race of a main bearing is press-fitted to a bearing journal portion formed near an end of the main shaft on a compressor side; and an outer race of the main bearing is press-fitted to a bearing bore portion formed in a partition member that separates the electric motor and the compressor, wherein the bearing journal portion is formed in a shape into which the inner race can be press-fitted from both sides in an axial direction thereof, and, in addition, an outer diameter of the bearing journal portion is made larger than an outer diameter of the rotor press-fitting portion, whereas the bearing bore portion is formed in a shape into which the outer race can be press-fitted from both sides in an axial direction thereof.

With the electric compressor according to the first aspect of the present invention described above, the inner race and the outer race of the main bearing can be press-fitted to the bearing journal portion of the main shaft and the bearing bore portion of the partition member, respectively, from both sides in the axial direction thereof, which enhances the degree of freedom for mounting when press-fitting the main bearing. Accordingly, the rotor, with a larger diameter than the main bearing, can be shrink-fitted to the main shaft at an early stage, which enhances the ease of performing the shrink-fitting step. Therefore, even if the main-bearing outer diameter is made smaller than the rotor outer diameter, production efficiency does not drop.

It is desirable that an electric compressor according to a second aspect of the present invention be configured such that, in the first aspect described above, a space into which a tool for press-fitting the main bearing can be inserted is provided between the rotor press-fitting portion and the bearing journal portion of the main shaft.

With this configuration, even after the rotor is press-fitted to the rotor press-fitting portion, the main bearing can be press-fitted to the bearing journal portion, the partition member can be press-fitted to an area surrounding the main bearing, which is press-fitted to the bearing journal portion, and the partition member to which the main bearing is press-fitted in advance can be press-fitted to the bearing journal portion, which further enhances the degree of freedom for mounting.

An assembly method of an electric compressor according to the first aspect of the present invention is an assembly method for an electric compressor including, in a step of assembling an electric compressor according to the above-described first aspect, first, shrink-fitting the rotor to the rotor press-fitting portion of the main shaft; also press-fitting the outer race of the main bearing to the bearing bore portion of the partition member; and subsequently press-fitting the inner race of the main bearing to the bearing journal portion of the main shaft from an opposite side from the rotor.

With this assembly method, because the rotor of the electric motor is shrink-fitted to the main shaft at an early stage, the ease of performing the shrink-fitting step is enhanced. In addition, even if the main-bearing outer diameter is made smaller than the rotor outer diameter, the main bearing can be easily press-fitted to the main shaft and the partition member, and thus, production efficiency does not drop. Furthermore, because the main shaft and the partition member are combined after the work involved in mounting the rotor to the main shaft and the work involved in press-fitting the main bearing to the partition member are separately performed, the work efficiency is high.

An assembly method of an electric compressor according to the second aspect of the present invention is an assembly method for an electric compressor including, in a step of assembling an electric compressor according to the above-described second aspect, first, shrink-fitting the rotor to the rotor press-fitting portion of the main shaft; next, press-fitting the bearing journal portion to the inner race of the main bearing from a rotor side while bringing the press-fitting tool into contact with an end surface of the bearing journal portion on the rotor side; and subsequently press-fitting the outer race to the bearing bore portion of the partition member from the rotor side while bringing the press-fitting tool into contact with the end surface of the outer race on the rotor side.

With this assembly method, because the rotor of the electric motor is shrink-fitted to the main shaft at an early stage, the ease of performing the shrink-fitting step is enhanced. In addition, in the case in which the main-bearing outer diameter is made smaller than the rotor outer diameter, the main bearing can be easily press-fitted to the main shaft or the partition member by employing the press-fitting tool even after shrink-fitting the rotor to the main shaft.

Advantageous Effects of Invention

With an electric compressor and an assembly method thereof according to the present invention, a main-bearing outer diameter can be made smaller than a rotor outer diameter without causing a drop in production efficiency, and, in addition, the ease of performing a shrink-fitting step can be enhanced by making it possible to mount a rotor of an electric motor to a main shaft at an early stage.

DESCRIPTION OF EMBODIMENTS

Figure 1:
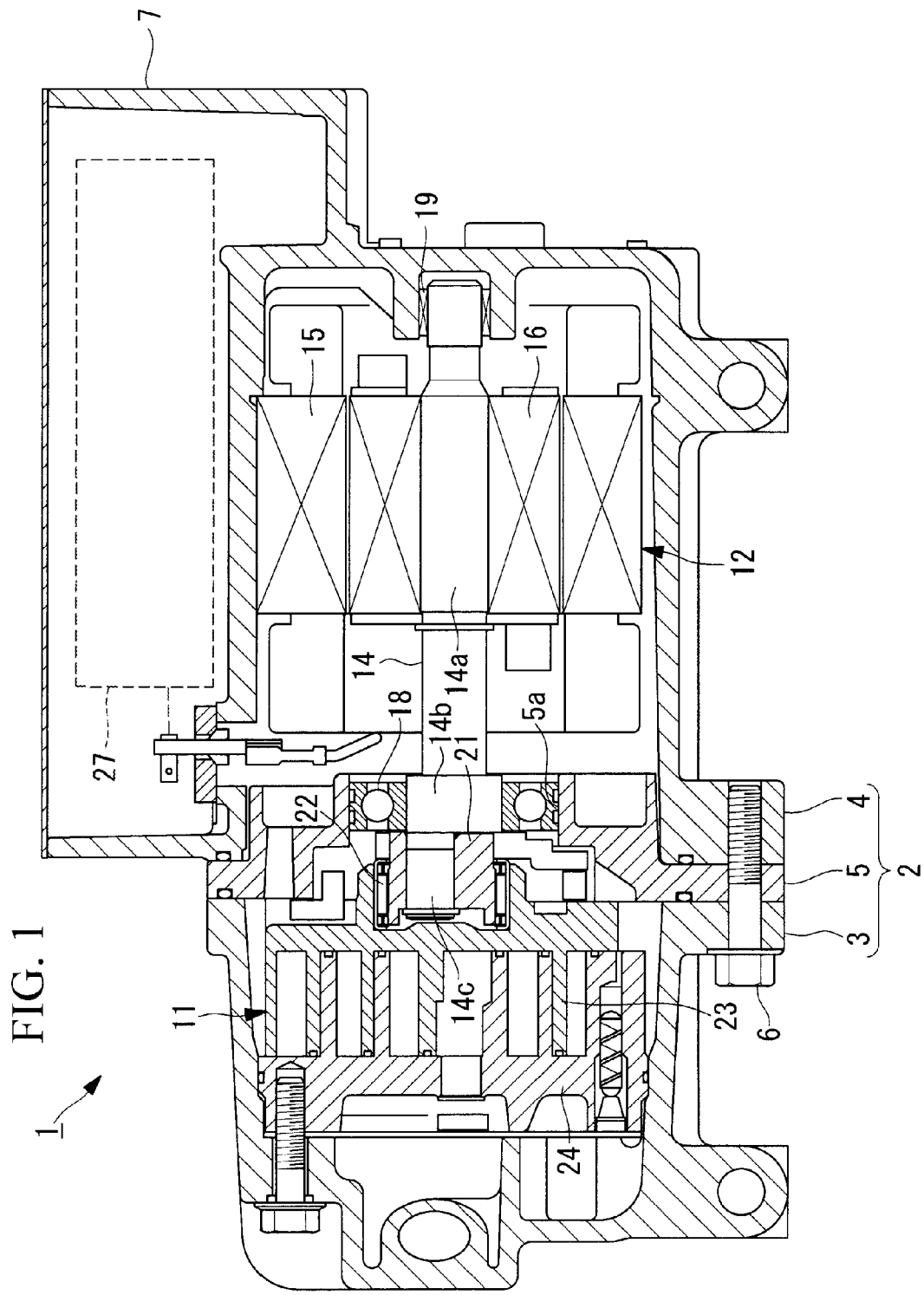
FIG. 1 is a longitudinal cross-sectional view explaining, in outline, the configuration of an electric compressor according to an embodiment of the present invention.

Embodiments of an electric compressor and an assembly method thereof according to the present invention will be described below with reference to FIGS. 1 and 2. FIG. 1 is a longitudinal cross-sectional view explaining, in outline, the configuration of the electric compressor according to this embodiment. This electric compressor 1 is a compressor employed in a vehicle air conditioner.

A compressor-side housing 3 and an electric-motor-side housing 4 are securely fastened together with bolts 6, with a partition member 5 sandwiched therebetween, thus forming an aluminum-alloy housing 2 that forms an outer shell of the electric compressor 1. The partition member 5 is a member that separates the compressor-side housing 3 and the electric-motor-side housing 4 and is also a holding member for a main bearing 18, described later. Note that an inverter box 7 is integrally formed at a top portion of the electric-motor-side housing 4.

A known scroll compression mechanism 11 is installed in the compressor-side housing 3, an electric motor 12 is installed in the electric-motor-side housing 4, and this scroll compression mechanism 11 and the electric motor 12 are integrated by being coaxially connected via a main shaft 14. A stator 15 and a rotor 16 that form the electric motor 12 are installed in the electric-motor-side housing 4; the stator 15 is secured to an inner circumferential surface of the electric-motor-side housing 4; and the rotor 16 is shrink-fitted to a rotor press-fitting portion 14a formed at an intermediate portion of the main shaft 14, which makes it integrally rotate together with the main shaft 14.

The main shaft 14 is axially supported in a freely rotatable manner by the main bearing 18 held at the partition member 5 and a sub bearing 19 held at an end of the electric-motor-side housing 4. As shown in FIG. 2, the main bearing 18 has a typical structure in which a plurality of ball bearings 18c are interposed between an outer race 18a and the inner race 18b. In addition, the sub bearing 19 is a typical needle bearing.

With regard to the main bearing 18, the outer race 18a thereof is press-fitted to a bearing bore portion 5a formed in the partition member 5, and the inner race 18b thereof is press-fitted to a bearing journal portion 14b formed by increasing the diameter of the main shaft 14 by one level in the vicinity of the end thereof that is closer to the scroll compression mechanism 11. As shown in FIG. 2, an outer diameter D1 of the main bearing 18 is smaller than an outer diameter D2 of the rotor 16 of the electric motor 12.

A crank pin 14c is eccentrically provided on a front surface of the bearing journal portion 14b, and this crank pin 14c is linked to an orbiting scroll member 23, which is accommodated in a rear half of the compressor-side housing 3, in an eccentrically rotatable manner via a bush 21 and a bearing 22. The orbiting scroll member 23 is fitted to a stationary scroll member 24 that is accommodated in a front half of the compression-side housing 3 by being secured thereto.

When the electric motor 12 is activated and the main shaft 14 is rotated, this rotation causes the orbiting scroll member 23 to eccentrically rotate via the crank pin 14c, the bush 21, and the bearing 22, and, by doing so, air suction, compression, and air exhaust effects are continuously generated between the orbiting scroll member 23 and the stationary scroll member 24. Accordingly, low-pressure refrigerant gas is taken in from a refrigerant inlet (not shown) provided at an end of the electric-motor-side housing 4, and this refrigerant gas is taken into the scroll compression mechanism 11 after flowing through the electric-motor-side housing 4, thus cooling the electric motor 12, is compressed therein to reach a high temperature and high pressure, and is expelled from an outlet (not shown) provided at an end of the compressor-side housing 3. Note that the electric motor 12 is controlled by an inverter device 27 accommodated inside the inverter box 7, and operating heat generated at the inverter device 27 is cooled by the refrigerant gas that flows in the electric-motor-side housing 4.

Figure 2:
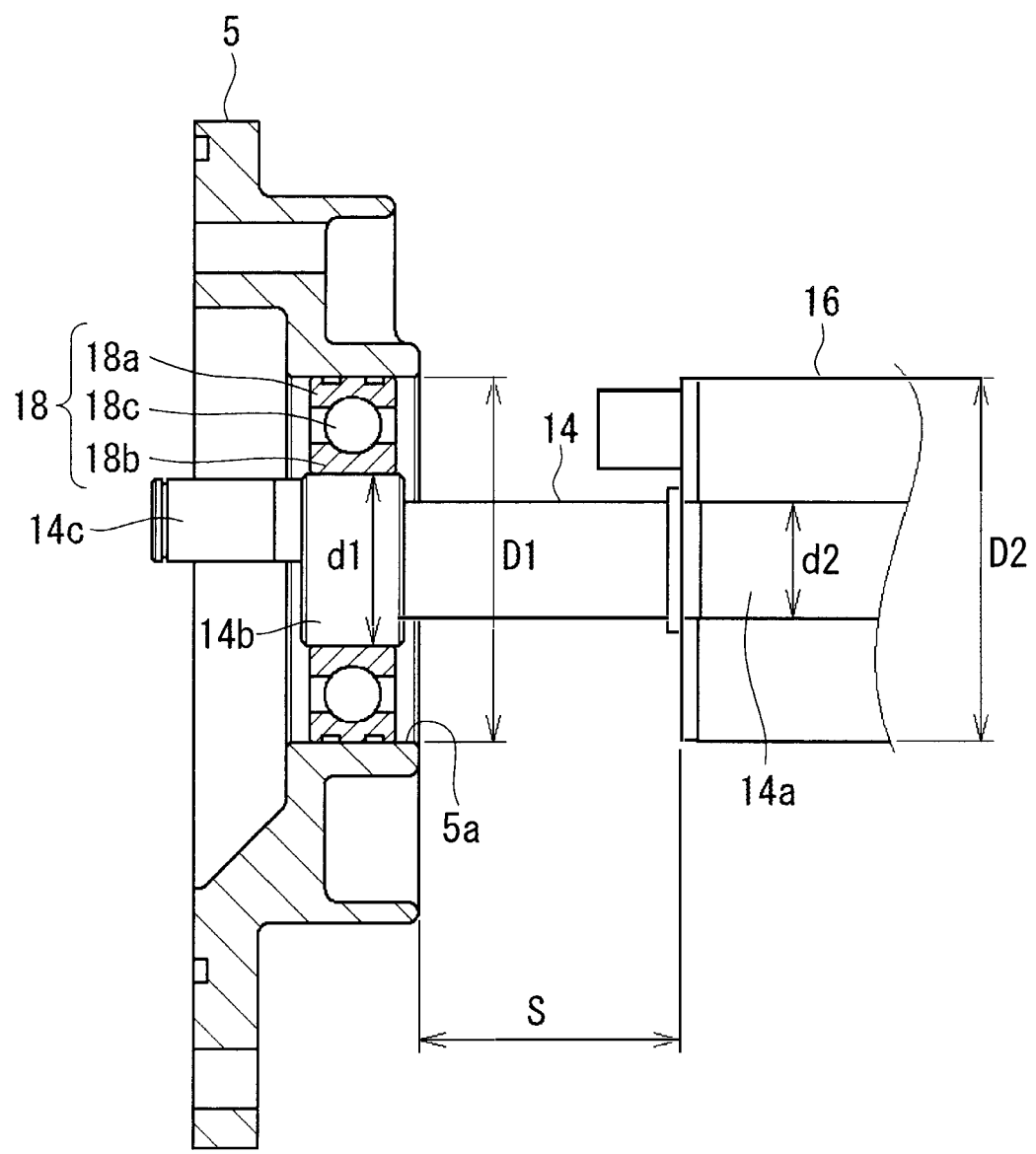
FIG. 2 is a longitudinal cross-sectional view in which the vicinities of a partition member and a main bearing of the electric compressor shown in FIG. 1 are enlarged.

As shown in FIG. 2 in an enlarged view, the bearing journal portion 14b formed on the main shaft 14 of the electric motor 12 is formed in a cylindrical shape without a level difference so that the inner race 18b of the main bearing 18 can be press-fitted from both sides in the axial direction thereof. Both shoulder portions of the bearing journal portion 14b are chamfered so as to facilitate press-fitting of the inner race 18b. In addition, an outer diameter d1 of the bearing journal portion 14b is set to be larger than an outer diameter d2 of the rotor press-fitting portion 14a.

On the other hand, the bearing bore portion 5a formed in the partition member 5 is formed as a hole with a cylindrical shape, having a fixed inner diameter, without a level difference so that the outer race 18a of the main bearing 18 can be press-fitted from both sides in the axial direction thereof. Both shoulder portions of the bearing bore portion 5a are also chamfered so as to facilitate press-fitting of the outer race 18a.

Figure 3A:
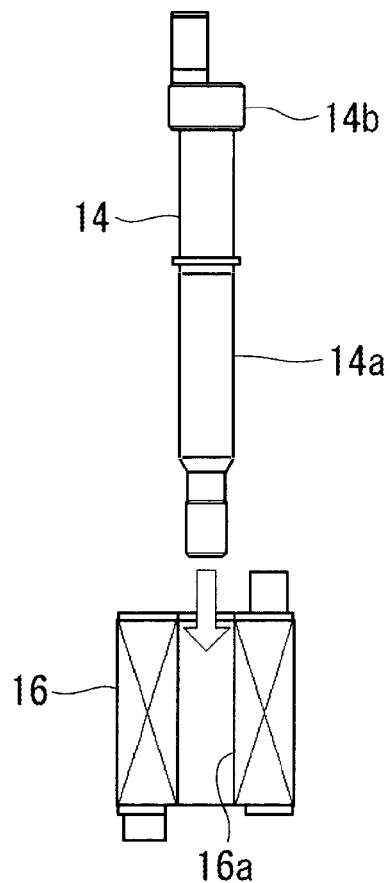
FIG. 3A is a longitudinal cross-sectional view showing a shrink-fitting step in a first embodiment of an assembly method of the electric compressor according to the present invention.
Figure 3B:
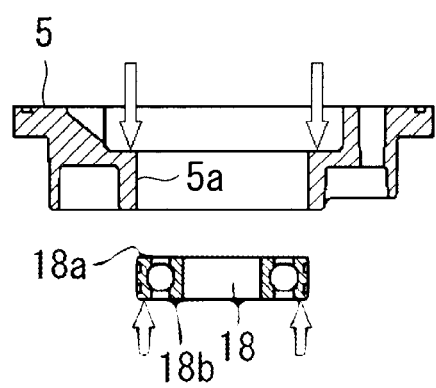
FIG. 3B is a longitudinal cross-sectional view showing an outer-race press-fitting step in the first embodiment of the assembly method of the electric compressor according to the present invention.
Figure 3C:
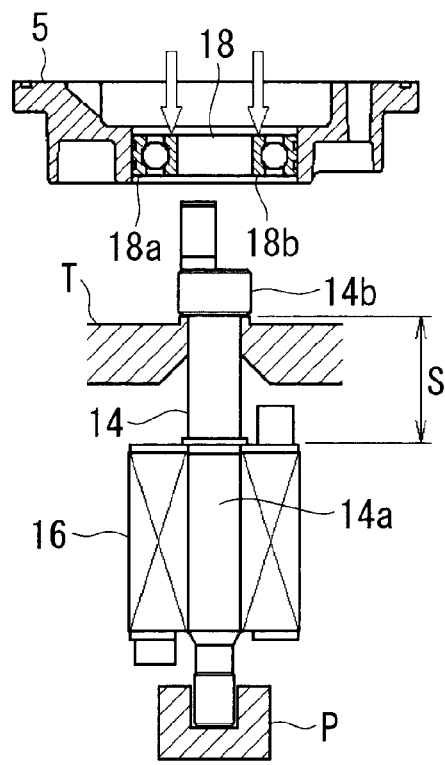
FIG. 3C is a longitudinal cross-sectional view showing an inner-race press-fitting step in the first embodiment of the assembly method of the electric compressor according to the present invention.
Figure 4A:
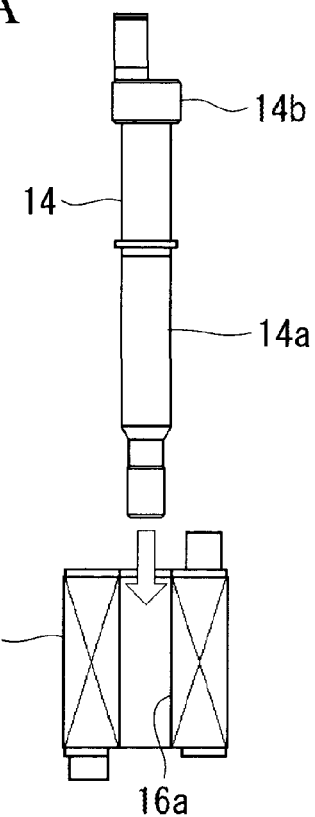
FIG. 4A is a longitudinal cross-sectional view showing a shrink-fitting step in a second embodiment of an assembly method of the electric compressor according to the present invention.
Figure 4B:
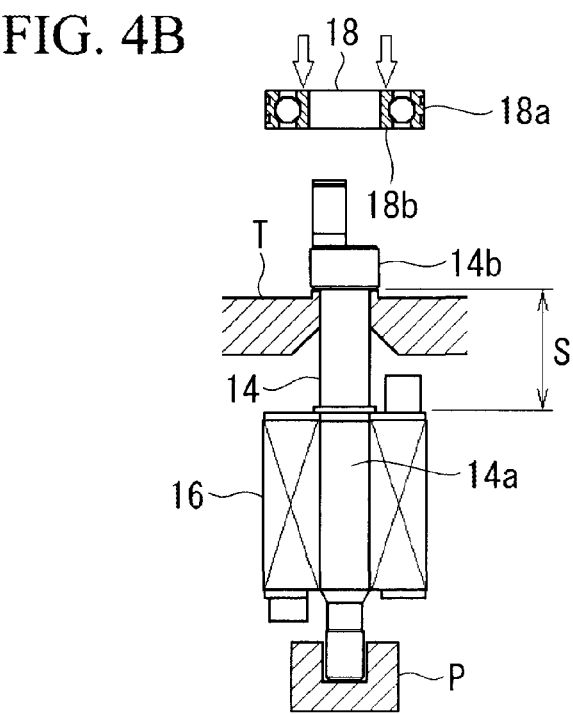
FIG. 4B is a longitudinal cross-sectional view showing an inner-race press-fitting step in the second embodiment of the assembly method of the electric compressor according to the present invention.
Figure 4C:
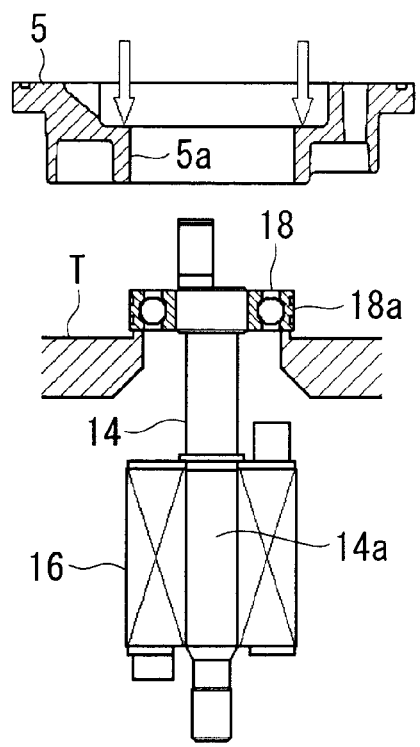
FIG. 4C is a longitudinal cross-sectional view showing an outer-race press-fitting step in the second embodiment of the assembly method of the electric compressor according to the present invention.

Furthermore, a space S into which a press-fitting tool T for press-fitting the main bearing 18 can be inserted, shown in FIG. 3C, as well as FIGS. 4B and 4C, is provided between the rotor press-fitting portion 14a of the main shaft 14 and the bearing journal portion 14b thereof.

With the electric compressor 1 configured as described above, by forming the bearing journal portion 14b of the main shaft 14 in a shape with which the inner race 18b of the main bearing 18 can be press-fitted from both sides thereof in the axial direction and by making the outer diameter d1 of this bearing journal portion 14b larger than the outer diameter d2 of the rotor press-fitting portion 14a, the main bearing 18 (inner race 18b) can be press-fitted to the bearing journal portion 14b of the main shaft 14 from both front and rear directions, and the degree of freedom for mounting when press-fitting the main bearing 18 can be enhanced.

In addition, by forming the bearing bore portion 5a in the partition member 5 in a shape with which the outer race 18a of the main bearing 18 can be press-fitted from both sides thereof in the axial direction, the main bearing 18 (outer race 18a) can be press-fitted to the bearing bore portion 5a from both front and rear directions, and with this point also, the degree of freedom for mounting when press-fitting the main bearing 18 can be enhanced.

With these features, the degree of freedom for mounting related to press-fitting of the main bearing 18 can be considerably enhanced, and, as a result, even if the outer diameter D1 of the main bearing 18 is made smaller than the outer diameter D2 of the rotor 16, unlike in a conventional unit, the press-fitting directions for the partition member 5 and the main bearing 18 are not restricted, and thus, the degree of freedom for designing the electric compressor 1 and the ease of performing the assembly thereof can be enhanced, which makes it possible to maintain good production efficiency.

Moreover, because the rotor 16 can be shrink-fitted to the main shaft 14 at an early stage, handling of the main shaft 14 and the rotor 16 during the shrink-fitting step and after the shrink-fitting has been completed is improved, which eliminates concerns about them being dropped, hit, and so forth during assembling, causing various parts to be damaged or to form dents in the main bearing 18, thus deteriorating the durability thereof. Furthermore, pallets for transportation and storage after completing the shrink-fitting step can be made small, and a storage space can be made more compact.

Note that, because positioning flanges for the main bearing 18 are not formed at the bearing journal portion 14b of the main shaft 14 and the bearing bore portion 5a of the partition member 5, in the unlikely event of foreign objects becoming attached to the outer circumferential surface of the bearing journal portion 14b, the inner circumferential surface of the bearing bore portion 5a, or the end surface of the main bearing 18, the foreign objects will not become caught between the positioning flanges and the main bearing 18. Accordingly, position shifting or tilting of the main bearing 18 due to the foreign objects can be prevented, and a drop in production efficiency can be avoided.

In addition, because the space S into which the tool T for press-fitting the main bearing 18 can be inserted is provided between the rotor press-fitting portion 14a of the main shaft 14 and the bearing journal portion 14b thereof, even after the rotor 16 is press-fitted to the rotor press-fitting portion 14a, the main bearing 18 can be press-fitted to the bearing journal portion 14b, the partition member 5 can be press-fitted to an area surrounding the main bearing 18, which is press-fitted to the bearing journal portion 14b, and the partition member 5 to which the main bearing 18 is press-fitted in advance can be press-fitted to the bearing journal portion 14b, thus making it possible to further enhance the degree of freedom for mounting.

First Embodiment of Assembly Method

FIGS. 3A to 3D show a first embodiment of an assembly method when mounting the partition member 5, the main shaft 14, the rotor 16, and the main bearing 18.

First, in the shrink-fitting step shown in FIG. 3A, the rotor 16 is shrink-fitted to the rotor press-fitting portion 14a of the main shaft 14. In this shrink-fitting step, the rotor 16 is heated, causing it to expand, whereas the main shaft 14 is cooled, causing it to shrink; the rotor press-fitting portion 14a of the main shaft 14 is inserted into a center hole 16a of the rotor 16; and both members 14 and 16 are subsequently cooled, thereby establishing the shrink-fitting.

In an outer-race press-fitting step shown in FIG. 3B, on the other hand, the outer race 18a of the main bearing 18 is press-fitted to the bearing bore portion 5a of the partition member 5 by using a press machine or the like so as to avoid tilting thereof. In this outer-race press-fitting step, a push block of the press machine (not shown) is pressed by being brought into contact only with the outer race 18a, as indicated by arrows. If this pressing force is exerted on the inner race 18b, an axial load occurs between the outer race 18a and the inner race 18b, which is not desirable because this would cause dents therein. In addition, the other pressing block is pressed by being brought into contact with the vicinity of an area surrounding the bearing bore portion 5a of the partition member 5, as indicated by arrows.

Note that the position of the outer race 18a in the axial direction in the bearing bore portion 5a is set by employing a press-fitting positioning jig (not shown). In addition, although the main bearing 18 in FIG. 3B is press-fitted to the bearing bore portion 5a of the partition member 5 from below, it may be press-fitted from above. Furthermore, either the shrink-fitting step shown in FIG. 3A or the outer-race press-fitting step shown in FIG. 3B may be performed first.

Next, in an inner-race press-fitting step shown in FIG. 3C, the inner race 18b of the main bearing 18 attached to the partition member 5 is press-fitted to the bearing journal portion 14b of the main shaft 14 by means of a press machine or the like from an opposite side from the rotor 16 already attached to the main shaft 14. At this time, in order to restrict movement of the main shaft 14 in the axial direction, the front end of the main shaft 14 on the rotor 16 side is brought into contact with a push block P or the like of the press machine. Then, the inner race 18b is press-fitted from the opposite side so that the pressing force for press-fitting is exerted only on the inner race 18b, as indicated by arrows. The position of the inner race 18b in the axial direction with respect to the bearing journal portion 14b is set by employing a press-fitting positioning jig (not shown).

Note that, in the case in which the space S into which the press-fitting tool T can be inserted is provided between the rotor press-fitting portion 14a of the main shaft 14 and the bearing journal portion 14b thereof, the movement of the main shaft 14 in the axial direction may be restricted by supporting the bearing journal portion 14b with the press-fitting tool T from the rotor 16 side. At this time, the position of the inner race 18b in the axial direction with respect to the bearing journal portion 14b is determined by the shape of the press-fitting tool T. Specifically, it is determined by the height of a protrusion formed at a tip of the press-fitting tool T that supports the bearing journal portion 14b.

Figure 3D:
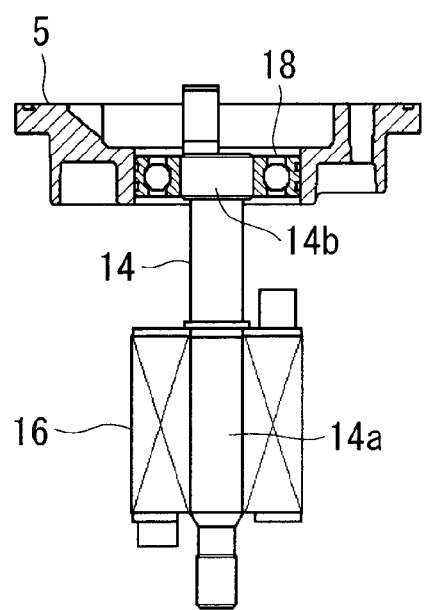
FIG. 3D is a longitudinal cross-sectional view showing a state in which the assembly has been completed in the first embodiment of the assembly method of the electric compressor according to the present invention.

As shown in FIG. 3D, assembly of the partition member 5, the main shaft 14, the rotor 16, and the main bearing 18 is completed in this way. With this assembly method, because the rotor 16 is shrink-fitted to the main shaft 14 in the earliest stage, the ease of performing the shrink-fitting step can be enhanced. In addition, even if the outer diameter of the main bearing 18 is made smaller than the outer diameter of the rotor 16, the main bearing 18 can be easily press-fitted to the main shaft 14 and the partition member 5, and the production efficiency does not drop. Furthermore, because the main shaft 14 and the partition member 5 are combined after the work involved in mounting the rotor 16 to the main shaft 14 and the work involved in press-fitting the main bearing 18 to the partition member 5 are separately performed, the work efficiency can be increased.

Second Embodiment of Assembly Method

FIGS. 4A to 4D show a second embodiment of the assembly method when mounting the partition member 5, the main shaft 14, the rotor 16, and the main bearing 18. This second embodiment assumes that the space S into which the press-fitting tool T can be inserted is provided between the rotor press-fitting portion 14a of the main shaft 14 and the bearing journal portion 14b thereof.

First, in a shrink-fitting step shown in FIG. 4A, the rotor 16 is shrink-fitted to the rotor press-fitting portion 14a of the main shaft 14. The specifics of the work involved are the same as those in the assembly method described in the first embodiment.

Next, in an inner-race press-fitting step shown in FIG. 4B, the inner race 18b of the main bearing 18 is press-fitted to the bearing journal portion 14b of the main shaft 14 from the opposite side from the rotor 16. At this time, the bearing journal portion 14b is press-fitted to the inner race 18b from the rotor 16 side while inserting the press-fitting tool T into the space S, bringing it into contact with an end surface of the bearing journal portion 14b on the rotor 16 side; alternatively, the inner race 18b is press-fitted from the opposite side from the rotor 16 while restricting the movement of the main shaft 14 in the axial direction by bringing an end of the main shaft 14 on the rotor 16 side into contact with the pushing block P or the like of the press machine. At this time, the pressing force of the press machine is exerted only on the end surface of the inner race 18b, as shown by arrows. Note that the position of the inner race 18b in the axial direction with respect to the bearing journal portion 14b is determined by, when the press-fitting tool T is employed, the shape of the press-fitting tool T, that is, the height of the protrusion formed at the tip of the press-fitting tool T, whereas, when the press-fitting tool T is not employed, it is set by employing the press-fitting positioning jig (not shown).

Next, in an outer-race press-fitting step shown in FIG. 4C, the outer race 18a of the main bearing 18 is press-fitted to the bearing bore portion 5a of the partition member 5 by using the press machine or the like so as to avoid tilting thereof. At this time, the press-fitting tool T is brought into contact only with an end surface of the outer race 18a from the rotor 16 side. On the other hand, the push block of the press machine (not shown) is pressed by being brought into contact with vicinity of the area surrounding the bearing bore portion 5a of the partition member 5, as indicated by arrows. The position of the outer race 18a in the axial direction in the bearing bore portion 5a is determined by the shape of the press-fitting tool T.

Figure 4D:
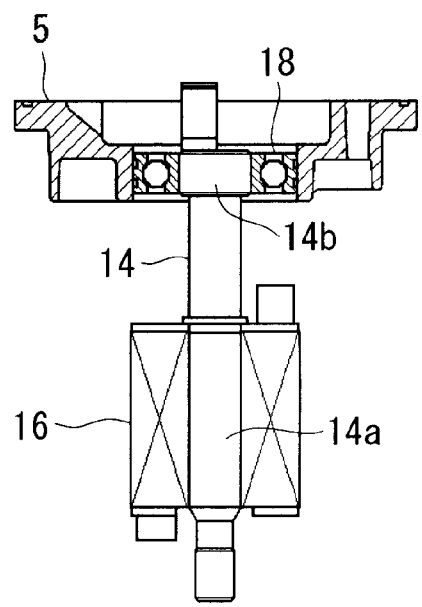
FIG. 4D is a longitudinal cross-sectional view showing a state in which the assembly has been completed in the second embodiment of the assembly method of the electric compressor according to the present invention.

As shown in FIG. 4D, assembly of the partition 5, the main shaft 14, the rotor 16, and the main bearing 18 is completed in this way. With this assembly method, because the rotor 16 is shrink-fitted to the main shaft 14 in the earliest stage, as with the assembly method of the first embodiment, the ease of performing during the shrink-fitting step can be enhanced. In addition, in the case in which the outer diameter of the main bearing 18 is made smaller than the outer diameter of the rotor 16, the main bearing 18 can be easily and reliably press-fitted to the bearing journal portion 14b or the bearing bore portion 5a by employing the press-fitting tool T, even after the rotor 16 has been shrink-fitted to the main shaft 14.

First Modification of Electric Compressor

Figure 5:
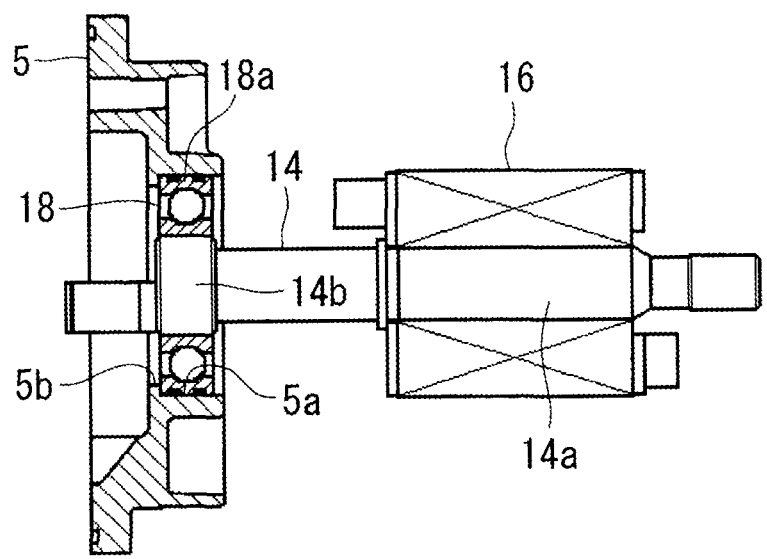
FIG. 5 is a longitudinal cross-sectional view showing a first modification of the present invention.

FIG. 5 is a longitudinal cross-sectional view showing a first modification of the present invention. In this figure, as well as FIGS. 6 and 7, described later, portions that are the same as those in the embodiment shown in FIG. 3D are given the same reference signs, and descriptions thereof will be omitted.

In this first modification, a positioning flange 5b is formed in the bearing bore portion 5a of the partition member 5. This positioning flange 5b protrudes along the circumferential direction at an inner circumference of an end of the bearing bore 5a on the opposite side from the rotor 16.

Because this positioning flange 5b is formed, it suffices to press-fit the outer race 18a until it comes into contact with the positioning flange 5b when press-fitting the outer race 18a of the main bearing 18 to the bearing bore portion 5a; therefore, positioning thereof can be performed accurately.

Second Modification of Electric Compressor

Figure 6:
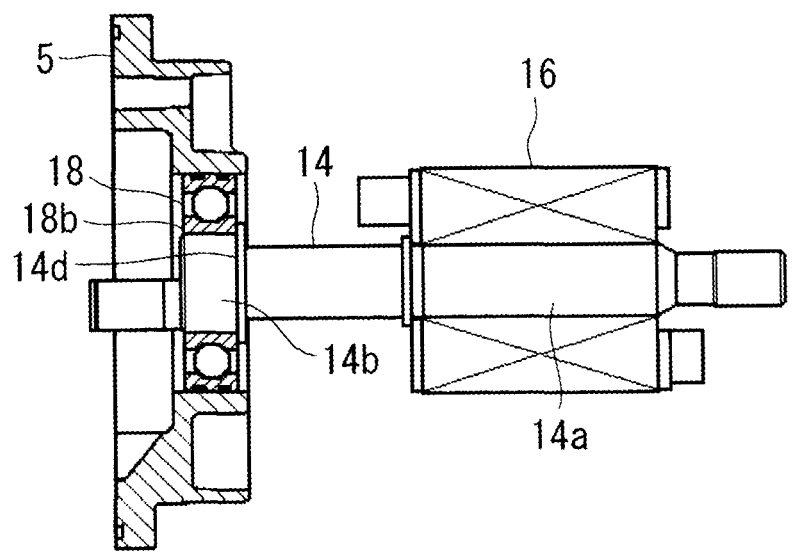
FIG. 6 is a longitudinal cross-sectional view showing a second modification of the present invention.

FIG. 6 is a longitudinal cross-sectional view showing a second modification of the present invention. In this second modification, a positioning flange 14d is formed in the bearing journal portion 14b of the main shaft 14. This positioning flange 14d protrudes at an outer circumference of an end of the bearing journal portion 14b on the rotor 16 side, in the circumferential direction.

Because this positioning flange 14d is formed, it suffices to press-fit the inner race 18b until it comes into contact with the positioning flange 14d when press-fitting the inner race 18b of the main bearing 18 to the bearing journal portion 14b; therefore, positioning thereof can be performed accurately.

Third Modification of Electric Compressor

Figure 7:
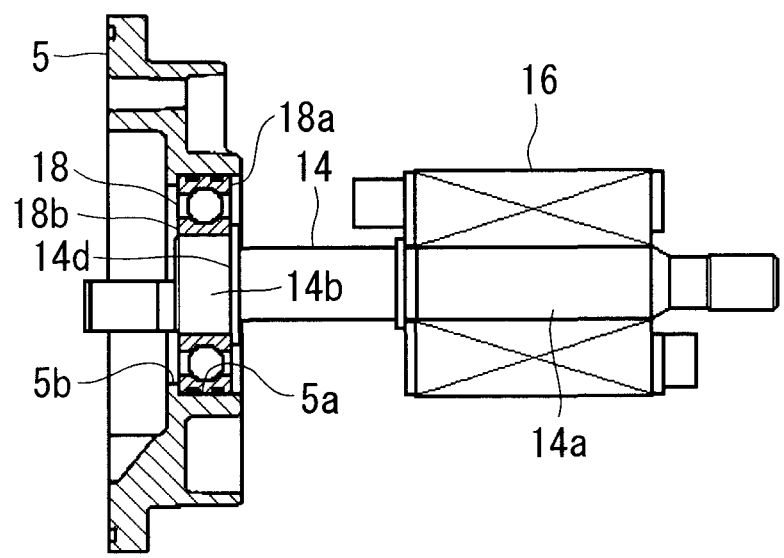
FIG. 7 is a longitudinal cross-sectional view showing a third modification of the present invention.

FIG. 7 is a longitudinal cross-sectional view showing a third modification of the present invention. In this third modification, the positioning flange 5b is formed in the bearing bore portion 5a of the partition member 5, and the positioning flange 14d is formed in the bearing journal portion 14b of the main shaft 14. The positioning flange 5b protrudes at the inner circumference of the end of the bearing bore 5a on the opposite side from the rotor 16, and the positioning flange 14d protrudes at the outer circumference of the end of the bearing journal portion 14b on the rotor 16 side.

By forming the positioning flange 5b in the bearing bore portion 5a and also by forming the positioning flange 14d in the bearing journal portion 14*b* in this way, the press-fitting position of the main bearing 18 with respect to the bearing bore 5*a* and the bearing journal portion 14*b* can be set accurately.

Note that, even if the first to third modifications described above are employed, the first embodiment and the second embodiment of the assembly method according to the present invention can both be applied.

REFERENCE SIGNS LIST 1 electric compressor
2 housing
3 compressor-side housing
4 electric-motor-side housing
5 partition member
5*a* bearing bore portion
11 scroll compression mechanism, serving as a compressor
12 electric motor
14 main shaft
14*a* rotor press-fitting portion
14*b* bearing journal portion
16 rotor
18 main bearing
18*a* outer race
18*b* inner race
D1 main-bearing outer diameter
D2 rotor outer diameter
S space
T press-fitting tool

The invention claimed is:

1. An assembly method for an electric compressor in which an electric motor and a compressor are coaxially integrated in a housing; a rotor is shrink-fitted to a rotor press-fitting portion formed at an intermediate portion of a main shaft of the electric motor; an inner race of a main bearing is press-fitted to a bearing journal portion formed near an end of the main shaft on a side of the compressor; an outer race of the main bearing is press-fitted to a bearing bore portion formed in a partition member that separates the electric motor and the compressor; the bearing journal portion is formed in a shape into which the inner race can be press-fitted from both sides in an axial direction thereof, and, in addition, an outer diameter of the bearing journal portion is made larger than an outer diameter of the rotor press-fitting portion; and the bearing bore portion is formed in a shape into which the outer race can be press-fitted from both sides in an axial direction thereof, the assembly method including:

first, shrink-fitting the rotor to the rotor press-fitting portion of the main shaft;
also press-fitting the outer race of the main bearing to the bearing bore portion of the partition member; and
subsequently press-fitting the inner race of the main bearing to the bearing journal portion of the main shaft from an opposite side from the rotor.

2. An assembly method for an electric compressor in which an electric motor and a compressor are coaxially integrated in a housing; a rotor is shrink-fitted to a rotor press-fitting portion formed at an intermediate portion of a main shaft of the electric motor; an inner race of a main bearing is press-fitted to a bearing journal portion formed near an end of the main shaft on a side of the compressor; an outer race of the main bearing is press-fitted to a bearing bore portion formed in a partition member that separates the electric motor and the compressor; the bearing journal portion is formed in a shape into which the inner race can be press-fitted from both sides in an axial direction thereof, and, in addition, an outer diameter of the bearing journal portion is made larger than an outer diameter of the rotor press-fitting portion; and the bearing bore portion is formed in a shape into which the outer race can be press-fitted from both sides in an axial direction thereof; and a space into which a press-fitting tool for press-fitting the main bearing can be inserted is provided between the rotor press-fitting portion and the bearing journal portion of the main shaft, the assembly method including:

first, shrink-fitting the rotor to the rotor press-fitting portion of the main shaft;
next, press-fitting the bearing journal portion to the inner race of the main bearing from a rotor side while bringing the press-fitting tool into contact with an end surface of the bearing journal portion on the rotor side; and
subsequently press-fitting the outer race to the bearing bore portion of the partition member from the rotor side while bringing the press-fitting tool into contact with the end surface of the outer race on the rotor side.

* * * * *